(12) United States Patent
Moen

(10) Patent No.: US 10,329,103 B1
(45) Date of Patent: Jun. 25, 2019

(54) VIBRATING FLOOR FOR AND METHOD OF UNLOADING RESIDUAL GRAIN FROM A GRAIN STORAGE ENCLOSURE

(71) Applicant: Larry K. Moen, Dike, IA (US)

(72) Inventor: Larry K. Moen, Dike, IA (US)

( * ) Notice: Subject to any disclaimer, the term of this patent is extended or adjusted under 35 U.S.C. 154(b) by 1 day.

(21) Appl. No.: 15/614,228

(22) Filed: Jun. 5, 2017

(51) Int. Cl.
| | |
|---|---|
| *B61D 17/10* | (2006.01) |
| *B65G 65/40* | (2006.01) |
| *B65D 88/66* | (2006.01) |
| *E04H 7/22* | (2006.01) |

(52) U.S. Cl.
CPC ............ *B65G 65/40* (2013.01); *B65D 88/66* (2013.01); *E04H 7/22* (2013.01)

(58) Field of Classification Search
CPC ............ B65G 65/40; B65G 88/66; E04H 7/22
See application file for complete search history.

(56) References Cited

U.S. PATENT DOCUMENTS

| | | | | | |
|---|---|---|---|---|---|
| 2,004,936 | A * | 6/1935 | Dorn | ............... | B28B 1/526 222/198 |
| 3,199,664 | A * | 8/1965 | Baker | ............... | B65G 27/00 198/763 |
| 3,772,923 | A * | 11/1973 | Burt | ............... | B06B 1/164 198/770 |
| 4,557,086 | A * | 12/1985 | Liefer | ............... | B65D 88/72 52/194 |
| 4,881,665 | A * | 11/1989 | McGuire | ............... | B65D 88/66 222/181.3 |
| 4,907,721 | A * | 3/1990 | Poncet | ............... | B65D 88/54 198/533 |
| 6,631,821 | B2 * | 10/2003 | Vourganas | ............... | B65D 19/18 206/600 |
| 7,556,465 | B2 | 7/2009 | Moen | | |
| 8,312,818 | B2 * | 11/2012 | Poncet | ............... | B65G 65/44 105/422 |
| 2007/0170207 | A1 * | 7/2007 | Kraus | ............... | B65D 88/66 222/199 |
| 2009/0260539 | A1 * | 10/2009 | Poncet | ............... | B65G 65/44 105/422 |
| 2011/0225910 | A1 * | 9/2011 | Sukup | ............... | B65D 88/742 52/293.1 |
| 2014/0286716 | A1 * | 9/2014 | Cochrum | ............... | B65D 88/66 406/122 |

OTHER PUBLICATIONS

Martin, "Cougar B Series Hazardous Location Vibrator", Operator's Manual, M3932 (2012).

* cited by examiner

*Primary Examiner* — David P Angwin
*Assistant Examiner* — Bob Zadeh
(74) *Attorney, Agent, or Firm* — McKee, Voorhees & Sease, PLC

(57) ABSTRACT

An apparatus, system, and method for unloading residual particulate matter such as grain from a storage enclosure such as a grain bin, silo, or building having at least one floor opening. In one embodiment, a corrugated metal overfloor is added spaced above the bin floor by a framework of generally horizontal beams and plural downwardly depending legs. The frame work supports the overflooring at a slight (e.g. 1 or 2 degrees) slope from the bin sidewall towards the floor opening. Vibration generators are distributed across the overflooring and can be operated to generate vibration in the overflooring to influence residual particulate towards the floor opening.

21 Claims, 14 Drawing Sheets

(PLAN VIEW)

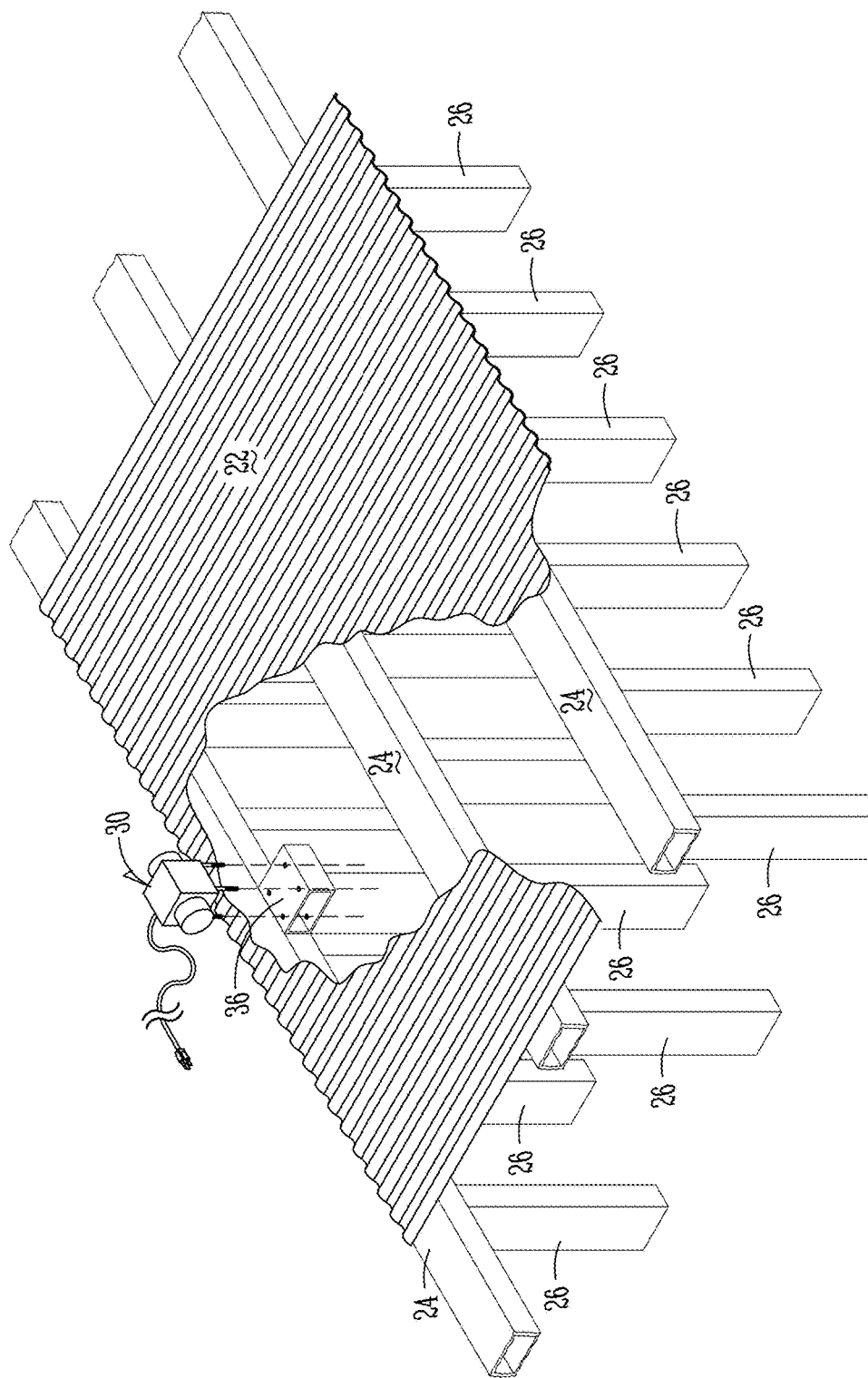

VIBRATING FLOOR FOR AND METHOD OF UNLOADING RESIDUAL GRAIN FROM A GRAIN STORAGE ENCLOSURE

CROSS-REFERENCE TO RELATED APPLICATIONS

This application claims the benefit of Provisional Application U.S. Ser. No. 62/345,219 filed on Jun. 3, 2016, all of which is herein incorporated by reference in its entirety.

I. BACKGROUND OF THE INVENTION

A. Field of the Invention

The present invention relates to grain or other particulate storage enclosures such as silos, bins, or buildings, and in particular, to apparatus and methods to assist in removing residual grain or particulate matter that does not naturally unload by gravity.

B. Problems in the Art

Grain storage enclosures can take a variety of form factors, sizes, and configurations. Large commercial enclosures can be on the order of over 100 feet in diameter (or width and length) and over 100 feet tall. Some have concrete sidewalls. Some are metal. Some are cylindrical in cross-section. Some are rectangular or square or other geometric shapes.

The present inventor innovated a method of constructing metal enclosures for high rates of unloading by gravity. See U.S. Pat. No. 7,556,465 by the present inventor and incorporated by reference herein in its entirety. Many such enclosures have a primary unloading by use of gravity. Some gravity unload through one or more openings in the sidewall. Some gravity unload through at least one sump or unloading opening in the bottom (typically concrete) across the bottom of the enclosure. Some enclosures allow for both side wall and bottom gravity unloading. It is also typical that a sliding or removable door or gate covers each opening. Each door or gate can be opened partially or fully when desired.

However, as noted in U.S. Pat. No. 7,556,465, most of these enclosures have a well-known problem when unloading. Because of a number of factors, particulates like grain will flow by gravity until they hit an angle of repose. From corn it may be on the order of approximately 20 to 30 degrees from horizontal. Angle of repose is essentially the angle of the sides of the cone that is formed when the particulate is poured vertically onto a flat surface. It does not spread to an even depth across the surface. Therefore, whether a side wall opening or a floor opening, grain will gravity feed until none is left above the edge of the side wall opening or at the edge of the floor opening. But this leaves a quantity of grain that will not gravity flow to an opening. Thus, at least when the bottom-most side wall opening or a floor opening is uncovered after gravity flow, residual grain exists and normally will not flow by gravity.

One approach is to have human workers enter the storage enclosure and manually shovel, sweep, or otherwise move the residual grain out of one of the openings. However, this presents certain issues. First, it involves expenditure of human resources. Second, it exposes the humans to potential hazards and risks. Examples are inhalation of air-borne grain dust, avalanche or sinking into the grain, or exposure to dangerous equipment. Residual grain in large enclosures can be many feet deep.

Another approach is mechanical residual grain unloaders. One example is a sweep auger. This adds significant expense, both capital and operating. It is also an example of dangerous equipment workers would be exposed to if they entered. This is usually necessary because sweep augers rarely can remove all residual grain. Also, sweep augers still require a final manual cleaning.

A different attempt at residual grain unloading utilizes an added floor or overfloor to the original structural bottom or floor of the bin or other enclosure. Vibrators are periodically placed across the overfloor. After gravity unloading, the vibrators are actuated to impart vibration to the overfloor. This is intended to influence the residual grain from its angle of repose and move to the floor opening(s). An example of such a vibrating floor is described in U.S. Pat. No. 4,907,721 to Poncet and incorporated by reference herein.

The inventor has identified room for improvement here.

First, the overfloor of U.S. Pat. No. 4,907,721 necessitates that the grain enclosure (bin, silo, building) floor or bottom be at an angle towards the floor opening(s). To do so in concrete is complex and expensive. It is difficult to get an accurate and uniform angle in poured concrete.

Second, because the floor must be angled, there is a reduction in the amount of internal storage space for grain for the given foot print. This is not a trivial issue.

Third, to support not only the load of grain possible in the enclosure when full, as well as plural mechanical vibrators across it, the overfloor usually must be made of fairly robust structural material. One example is relatively heavy or higher gauge metal (e.g. steel). These can be expensive.

Therefore, the residual material after gravity unloading ceases to be effective represents additional overhead and cost. There are a number of factors that must be considered when trying to address the problem. Some are antagonistic to one another. Either additional components must be built into the enclosure to attempt to remove residual grain or manual labor must be used, or both. This requires resources of labor, materials, and time to complete unloading of the enclosure.

II. SUMMARY OF THE INVENTION

It is therefore a primary object, feature, aspect, or advantage of the present invention to provide improvements over or solve problems and deficiencies related to the state of the art in this technical area.

Additional objects, features, aspects or advantages of the present invention include an apparatus, system, or method of a vibrational overfloor at the bottom of a storage enclosure which:

a. Can be configured and tuned for a variety of different types, shapes, and configurations of storage enclosures. Non-limiting examples are bins, silos, and buildings with at least one bottom unloading sump or opening.

b. Is effective to unload at least most of residual grain or particulate matter after gravity unloading ceases to be effective, and can in some circumstances effectively unload almost all if not all residual grain or particulate.

c. Can be constructed of materials and assembled with techniques that can be at least as economical as state of the art residual unloading systems, and likely is more economical when considering capital, labor, and operating costs over time.

d. Does not unduly reduce internal storage space.

e. Is relatively easy to install.

f. Can be integrated with other grain storage functions, such as aeration systems.

In one aspect of the invention, an over-floor is added to the enclosure which has the following characteristics. It presents a generally horizontal supporting surface that has a slight angle (on the order of one to a hand-full of degrees) downward towards at least one unloading opening of the enclosure. A plurality of vertical links or legs extend down from the supporting surface and are dimensioned to sit on top of the enclosure bottom. A vibrational actuator or actuators is/are operatively coupled to the supporting surface. Operation of the actuator(s) sets up vibrational motion in the supporting surface. Residual grain is influenced from its angle of repose down that slight angle of the surface towards the unloading opening until it is substantially or fully removed from the enclosure.

In another aspect of the invention, the supporting surface is corrugated or nonplanar. The supporting surface can optionally include air holes through out at least a substantial area of it. The links or legs from the supporting surface suspend the surface above the bottom of the enclosure. The corrugations add stiffness and increase structural strength over the same thickness of material if flat. This allows use of cheaper material for the supporting surface while providing the same load-bearing ability. It can also assist in translating vibration from the actuator(s) to the particulate matter supported on the supporting surface. The legs provide an airspace beneath the supporting surface to allow airflow from an external source up into the particular matter supported on the supporting surface.

In another aspect of the invention, the supporting surface takes different 2D and 3D forms. In one example it is generally planar. But the generally planar surface, whether or not flat or corrugated, can have different geometrical perimeters. One example is rectilinear (square or rectangular outline). Another is semi-circular. Circular is possible, especially for enclosures with just one center unload opening. Others are possible to fit within different enclosures. Alternatively, non-planar supporting surfaces (whether corrugated or flat) can be a rotated shape such as an inverted full or half conical section. In all these versions, the supporting surface can have a gradient of a slight angle from portions distal to portions proximal at least one outlet opening from the enclosure. Still further, the supporting surface can be unitary for the whole enclosure. Alternatively, it can be in segments, sections, or pieces, arranged to present a gradient towards at least one outlet opening.

These and other objects, features, aspects and advantages of the invention will become more apparent with reference to the accompanying specification and drawings.

III. BRIEF DESCRIPTION OF THE DRAWINGS

FIG. 4A is an enlarged view of the overfloor surface (simplified) with exposed portions to show one way to mount the vibrators.

Figure 5A:
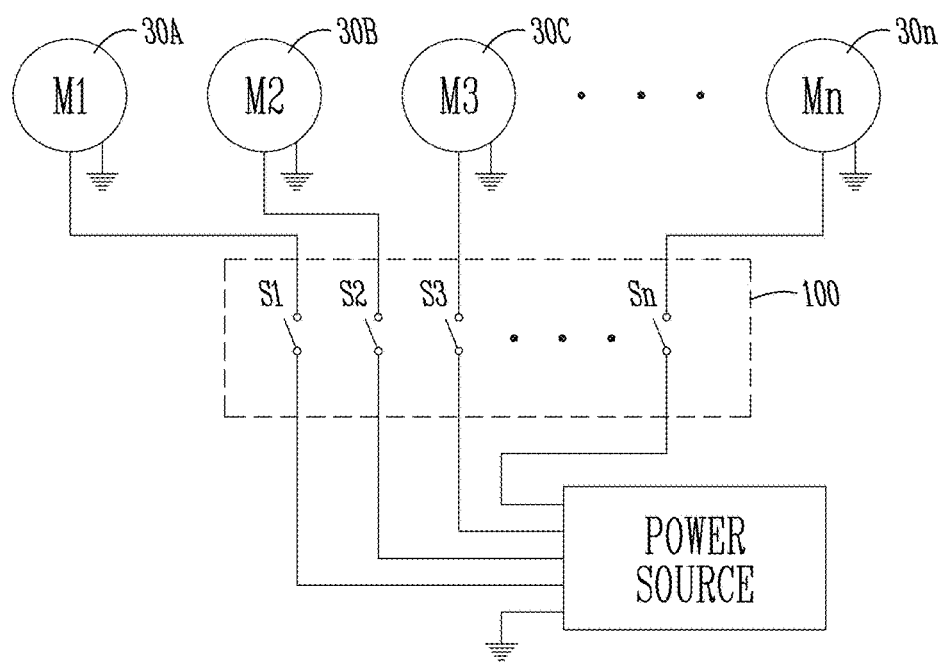
FIG. 5A is a highly schematic electrical diagram of a manual control system for operation of the vibrators of FIGS. 1-3.
Figure 5B:
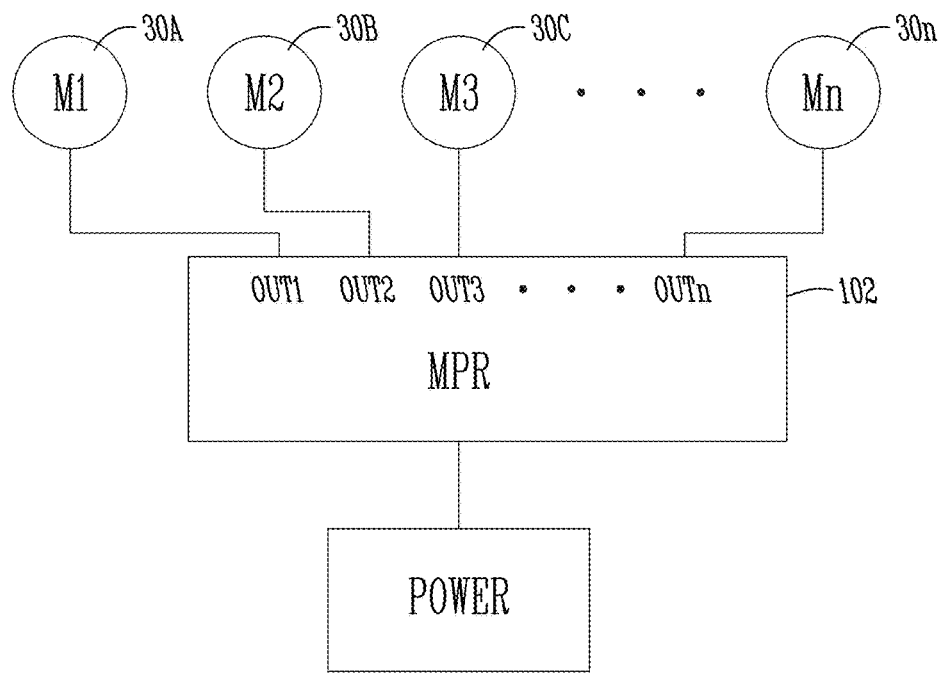
FIG. 5B is a highly schematic electrical diagram of a programmable control system for operation of the vibrators of FIGS. 1-3.
Figure 6A:
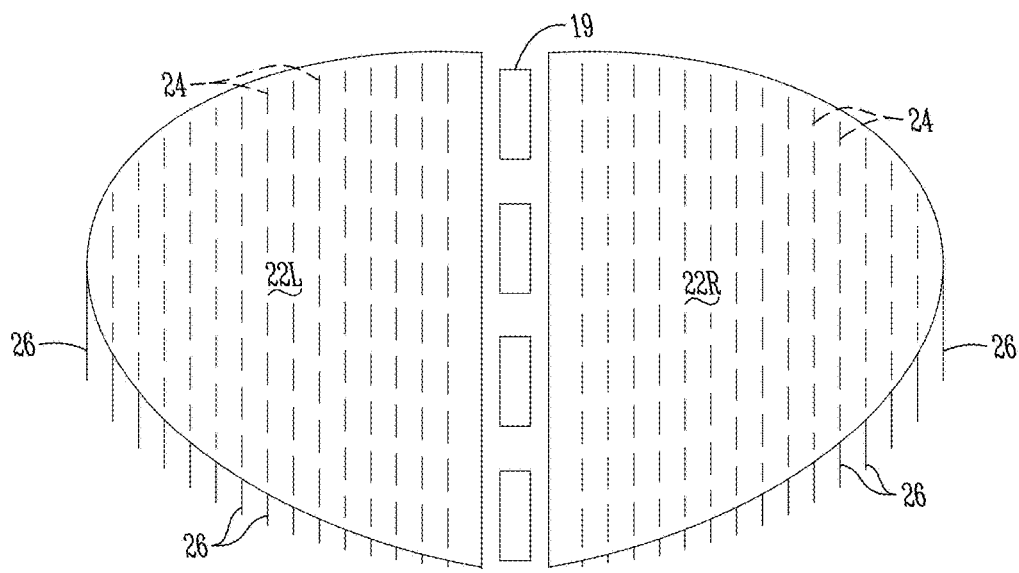
Figure 6B:
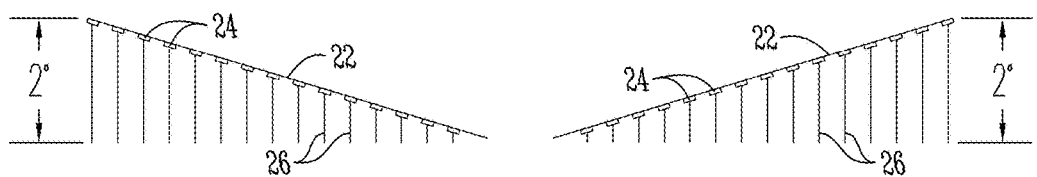

FIGS. 6A and B are highly diagrammatic perspective and side elevation illustrations of the embodiment of FIGS. 1 to 5A and B (circular bin with two planar converging overfloors to a center tunnel unloading).

Figure 7A:
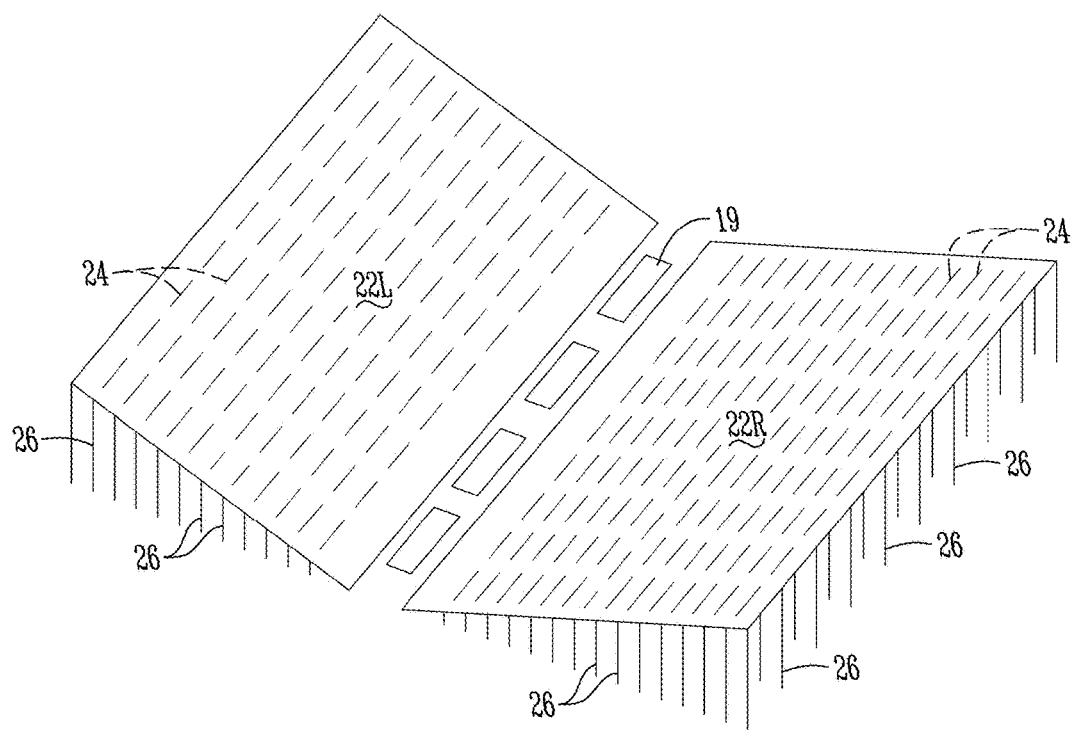
Figure 7B:
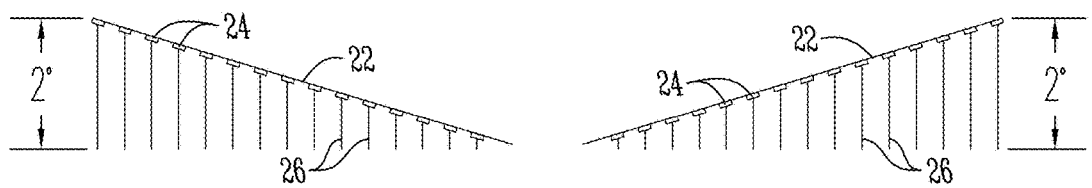

FIGS. 7A and B are highly diagrammatic perspective and side elevation illustrations of an alternative form factor for the overfloor according to the invention (rectangular bin or building with two planar converging overfloors to a center tunnel unloading).

Figure 8A:
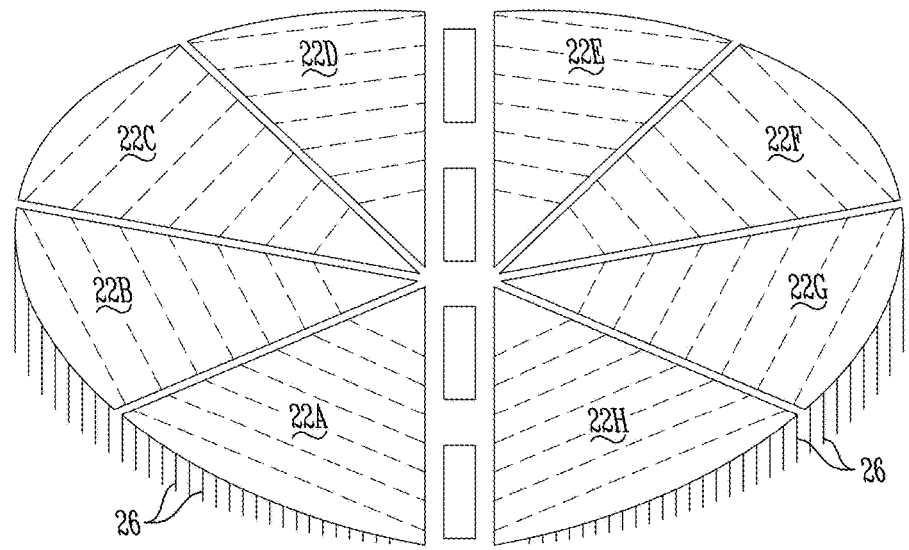
Figure 8B:
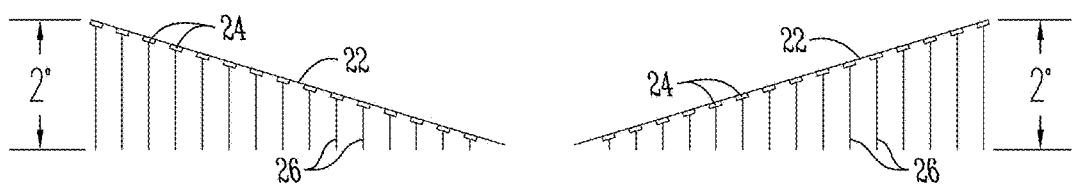

FIGS. 8A and B are simplified diagrammatic perspective and side elevation views of another possible alternative embodiment (circular bin with pie-shaped planar converging overfloor sections to a center tunnel unloading).

Figure 9A:
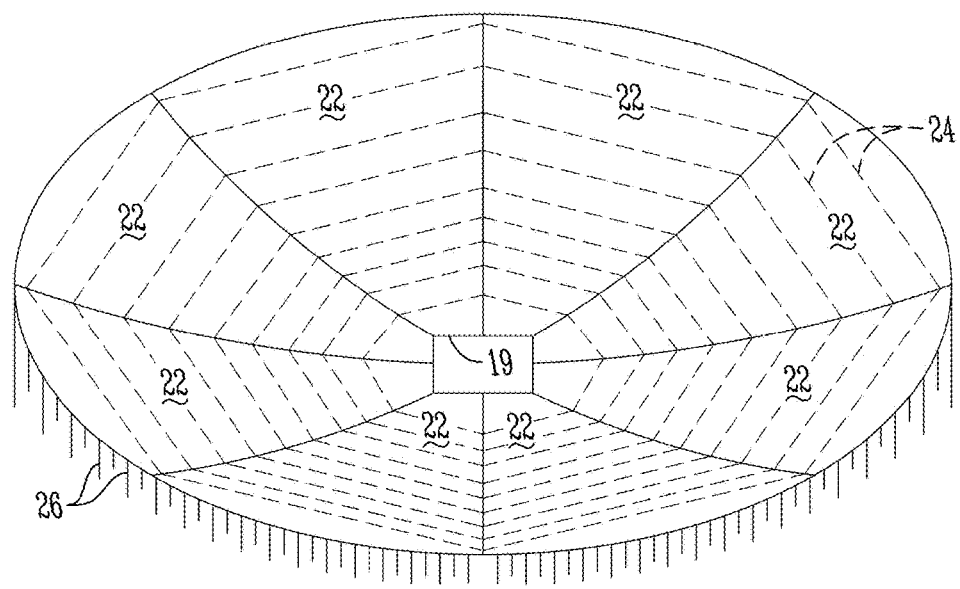
Figure 9B:
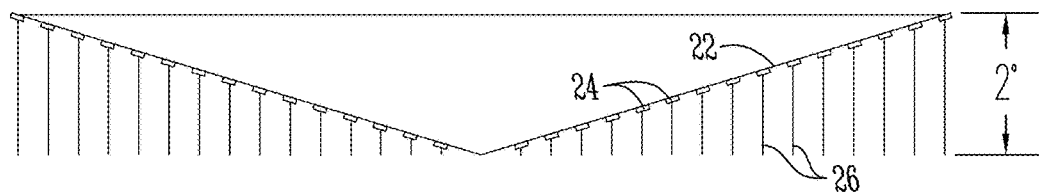

FIGS. 9A and B are simplified diagrammatic perspective and side elevation views of another possible alternative embodiment (circular bin with pie-shaped concave converging overfloor sections to a single center unloading opening in bin floor).

Figure 10A:
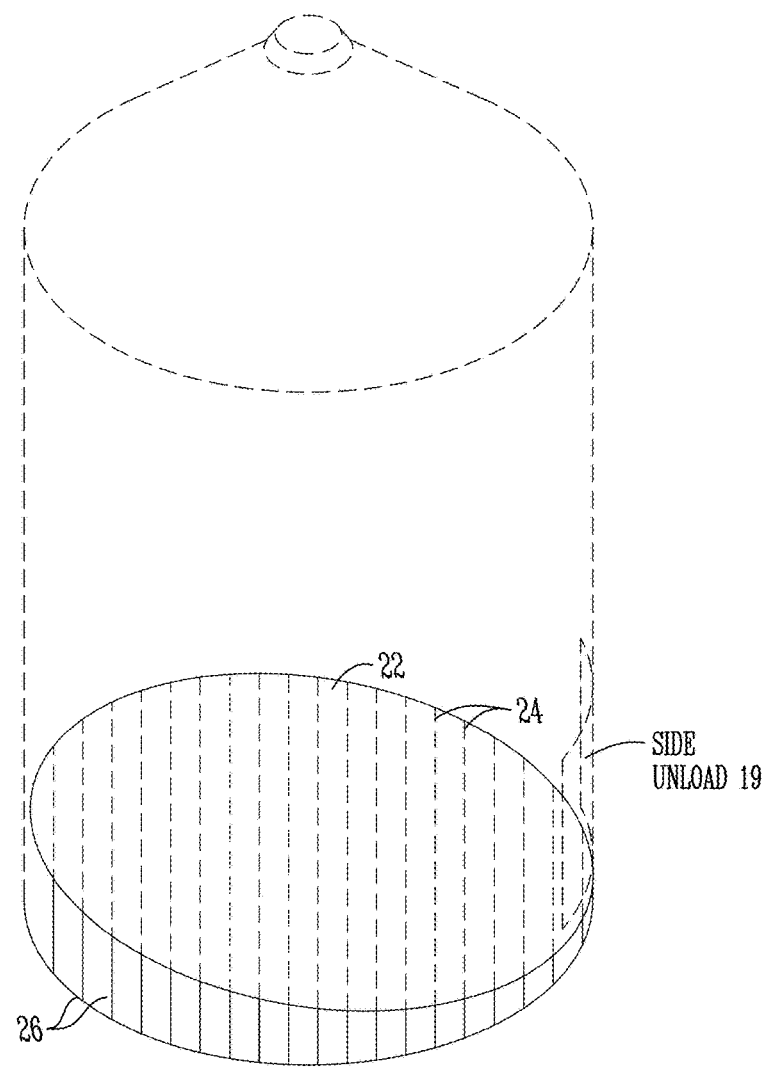
Figure 10B:
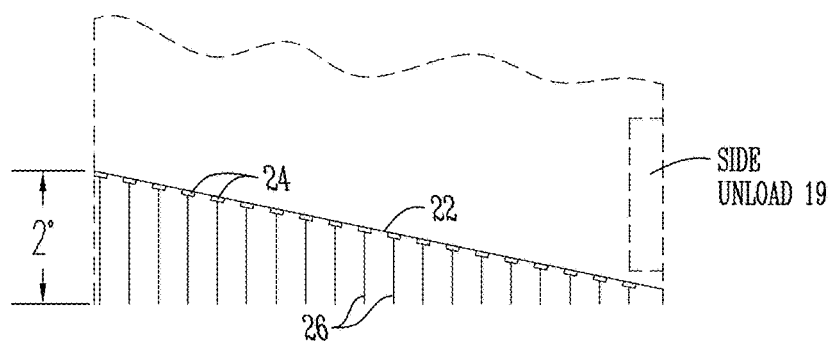

FIGS. 10A and B are simplified diagrammatic perspective and side elevation views of another possible alternative embodiment (circular bin with single planar overfloor tilted towards an unloading opening low in the side wall of the bin).

Figure 11A:
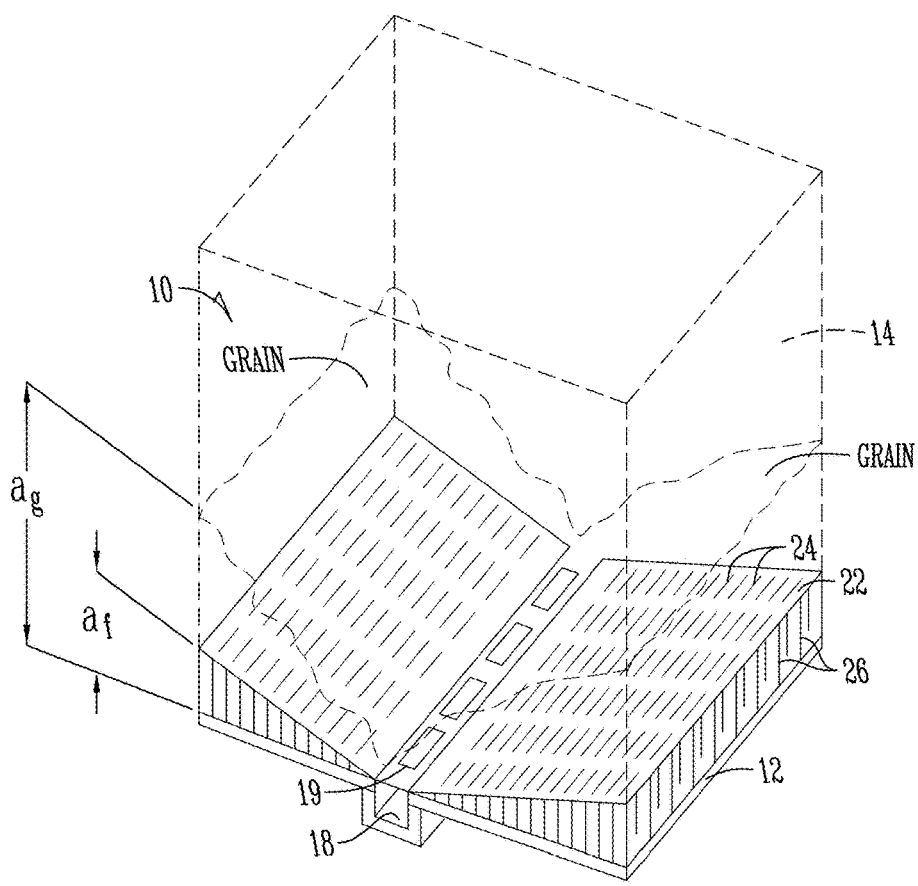
Figure 11B:
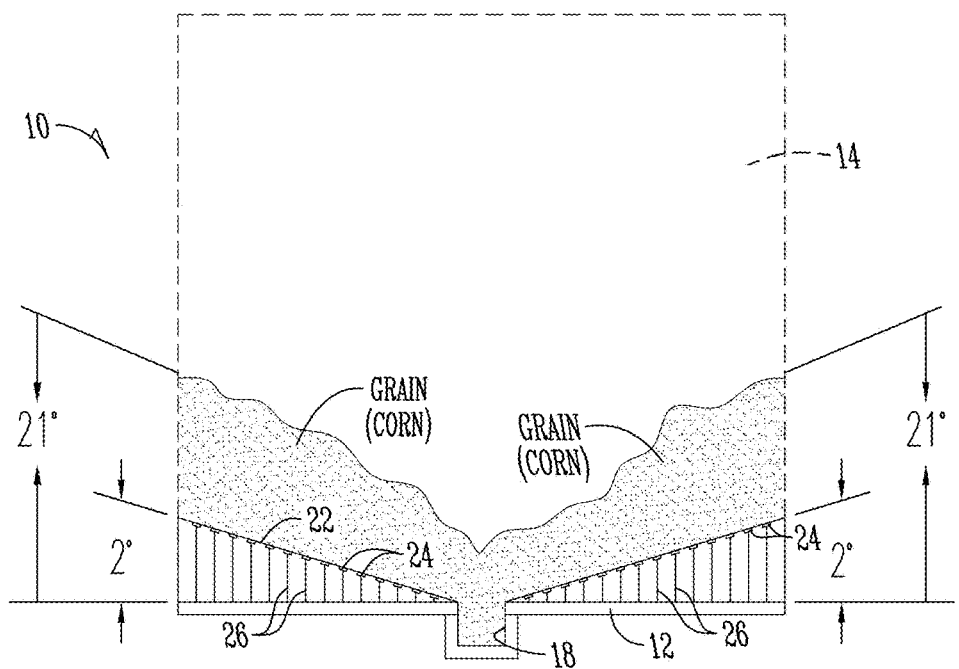

FIGS. 11A and B are simplified diagrammatic perspective and side elevation views of an embodiment like FIGS. 7A and B, and illustrating (not to scale) how residual grain at angle of repose $a_g$ can remain in bin after gravity unloading, and overflooring with vibrators can be used to unload that residual grain.

Figure 12:
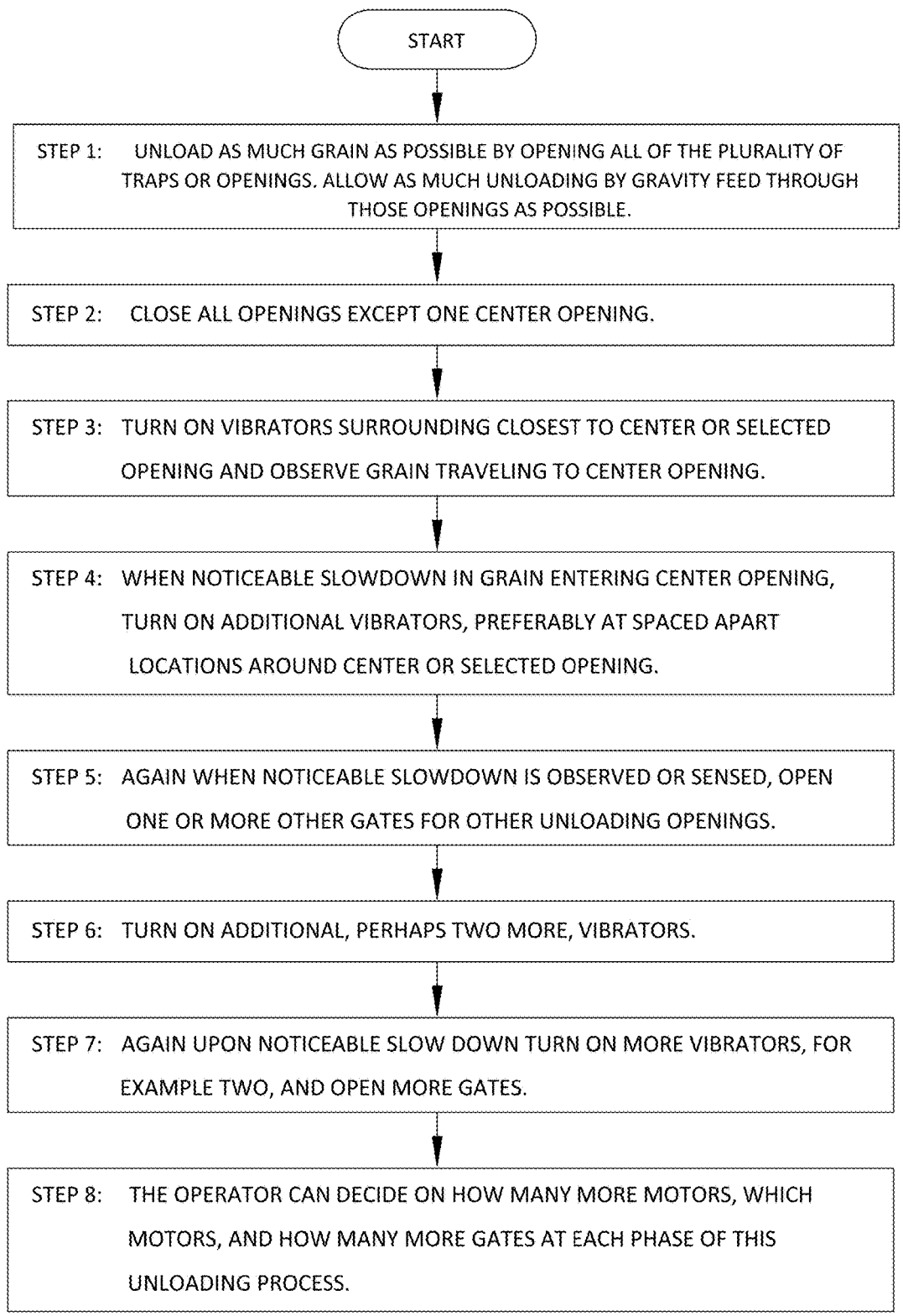

FIG. 12 is a flow chart of a method according to one aspect of the invention.

IV. DETAILED DESCRIPTION OF EXEMPLARY EMBODIMENTS OF THE INVENTION

A. Overview

For better understanding of the invention, and with frequent reference to the drawings, several ways the invention can be made and operated will now be described in detail. It is to be understood that these are examples only and neither inclusive nor exclusive of the different forms configurations of the invention can take.

Figure 1:
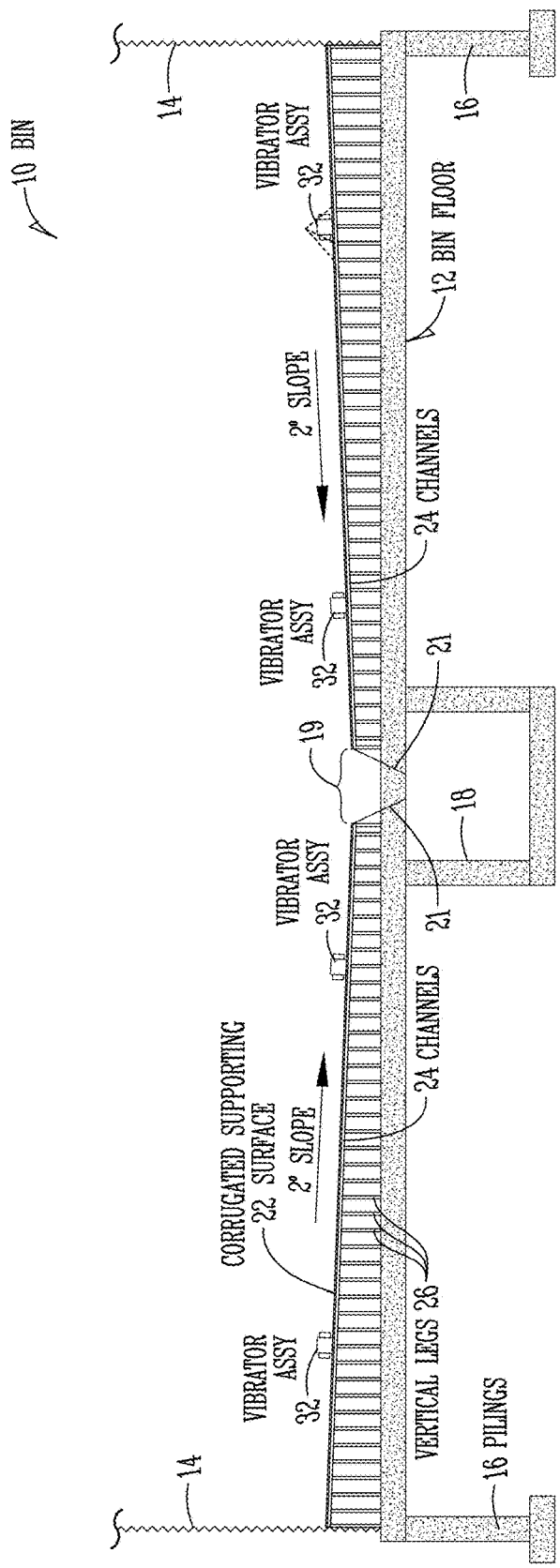
FIG. 1 is a greatly reduced scale side elevation of one example of the invention installed on a concrete floor for a cylindrical corrugated wall bin having a center unloading channel with multiple unloading openings linearly aligned along the channel.
Figure 2:
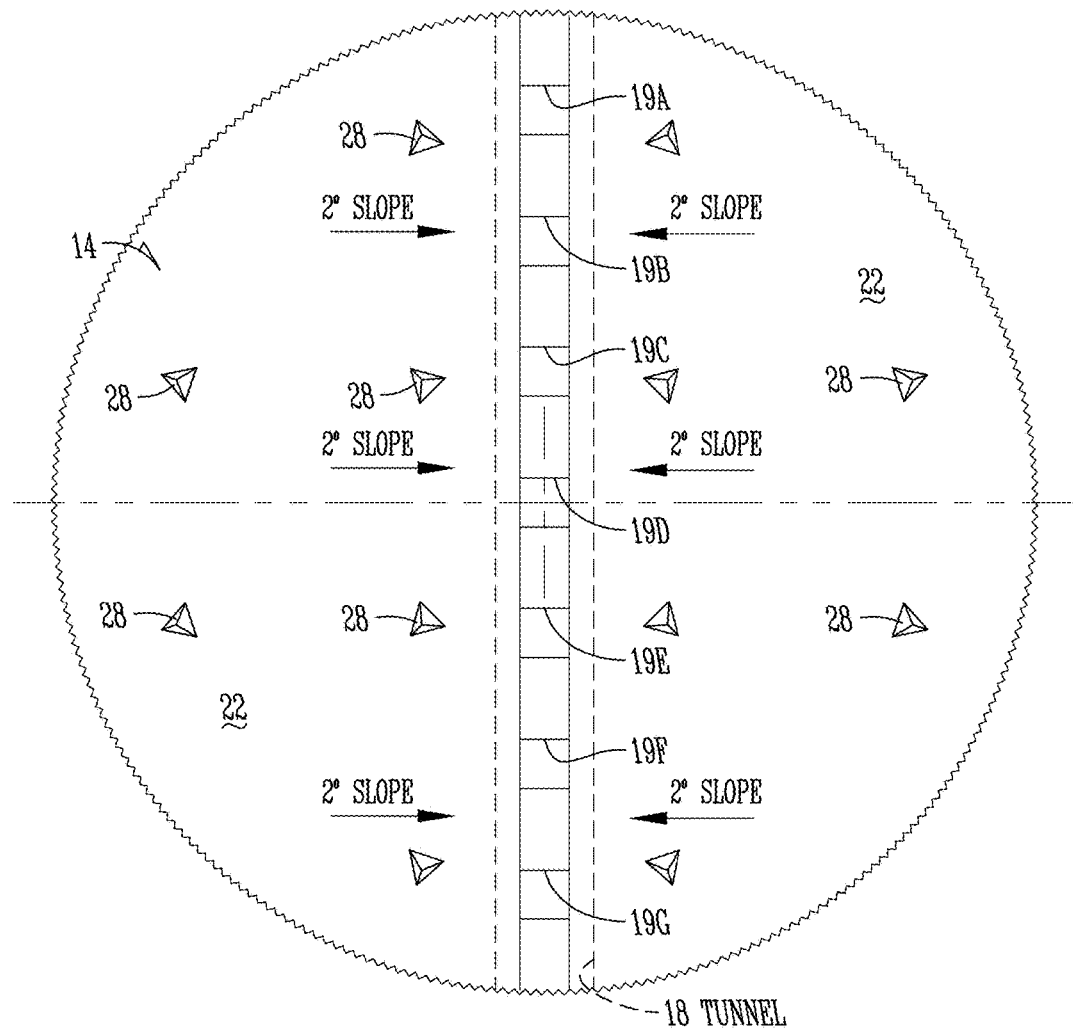
FIG. 2 is a top plan view of FIG. 1.

In the example of FIGS. 1-3, the invention is installed in a typical approximately 60 foot diameter concrete bottom, corrugated metal cylindrical side wall grain bin that extends from several tens to sometimes on the order of 100 or more feet vertically. A central unloading tunnel underneath the bottom of the bin (and extending across a diameter of the bin floor) has a plurality of sliding gates that can be manually opened or closed by someone from inside that tunnel. Equipment exists or can be placed in the tunnel to remove grain that falls into it by gravity. An example would be a grain auger. Such bins typically can also have a blower to inject air into the bin. These features are well-known to those skilled in the art.

It is to be understood, however, that the invention can be applied in analogous ways to different types of particulate matter storage enclosures. Some examples will be specifically shown and described. But those skilled in the art will appreciate how the invention could be installed and used in analogous ways to all sorts of enclosures, including for grains or other particulate matter.

Still further, those skilled in the art will appreciate that variations to the specific techniques and materials discussed in the embodiments below are possible and that these non-limiting examples are neither exclusive nor inclusive of all the different forms and embodiments the invention can take.

B. Embodiment 1

By referring to FIGS. 1-3, a grain storage bin 10 having a corrugated sheet metal sidewall 14 on a circular concrete bottom 12 is supported in the ground on pilings 16. A center channel or tunnel 18, tall enough for a person to move through, extends across a diameter of bin bottom 12 as shown in FIG. 2. A plurality of unload openings or sumps 19 are spaced along tunnel 20. The corrugated metal sidewall 14 is supported by the concrete bottom 12 and serves as a sidewall for grains, such as corn, stored in the enclosure or bin 10. These features are typical of many metal wall grain bins.

As will be appreciated by those skilled in this technical field, alternatively bin 10 could be a concrete sidewall silo, a concrete, metal, or other sidewall material building, or other form factor of enclosure. Additionally, the corn could also be other grains, or other bulk or particulate matter. Non-limiting examples of other grains are soybeans. Non-limiting examples of other particulate matter are gravel, coal, cement, carbon black, woodchips, food products, and sawdust.

This exemplary embodiment of the invention adds what will be called an "overfloor assembly" 20 to bin 10. By referring in particular to FIG. 3, overfloor assembly 20 includes a supporting surface 22 made of corrugated metal sheet panels. The panels 22 are supported above concrete bin floor 12 by a framework of generally horizontal beams 24 (e.g. metal tubes) and plural downward extending legs or links 26 (e.g. metal tubes).

Further details regarding the overfloor assembly are as follows:

1. Corrugated Perforated Metal Sheet 30

Figure 3A:
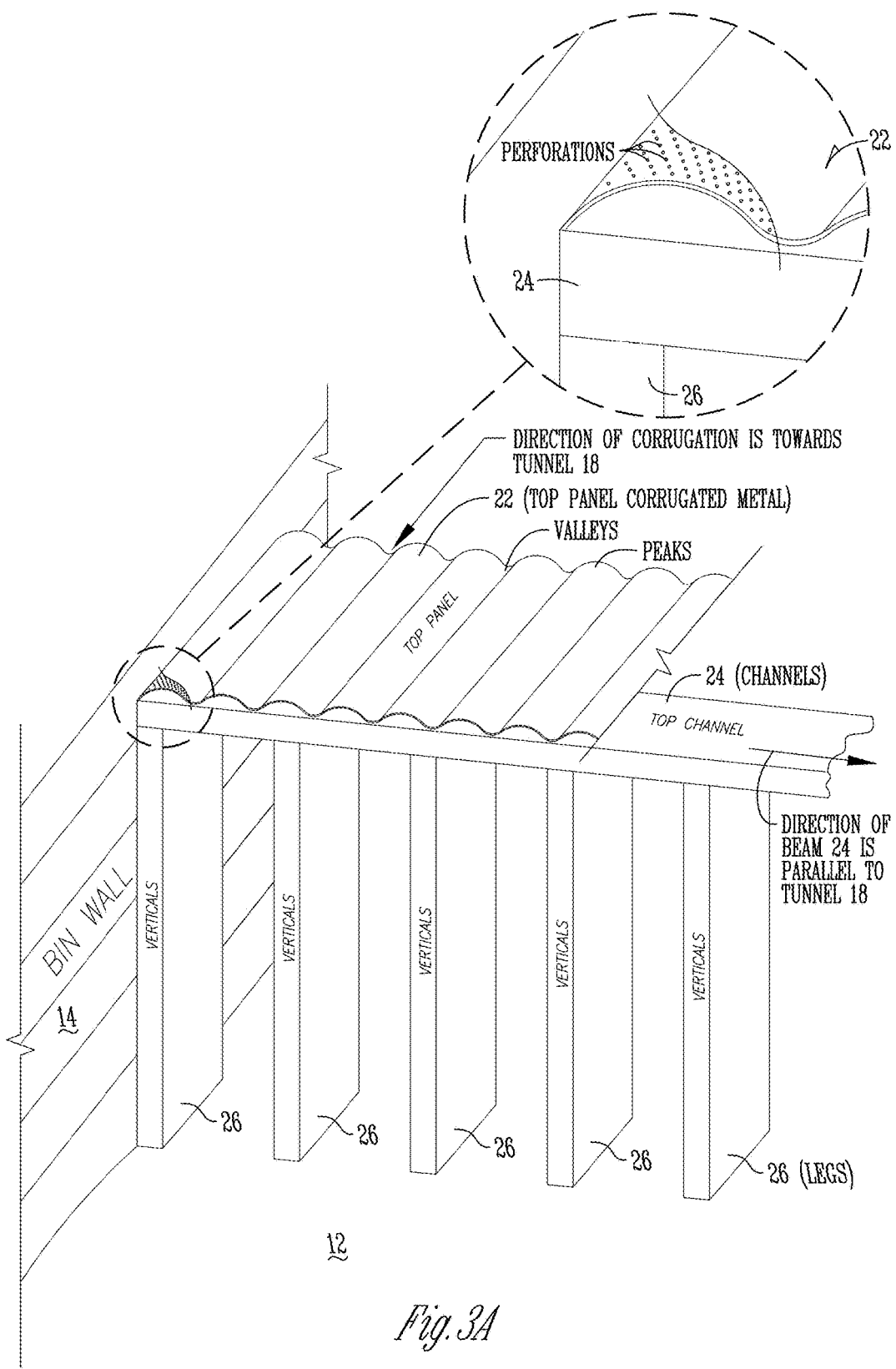
FIG. 3A is an enlarged partial view of a part of an overfloor assembly and its supporting framework similar to what is used with the embodiment of FIGS. 1 and 2.
Figure 3B:
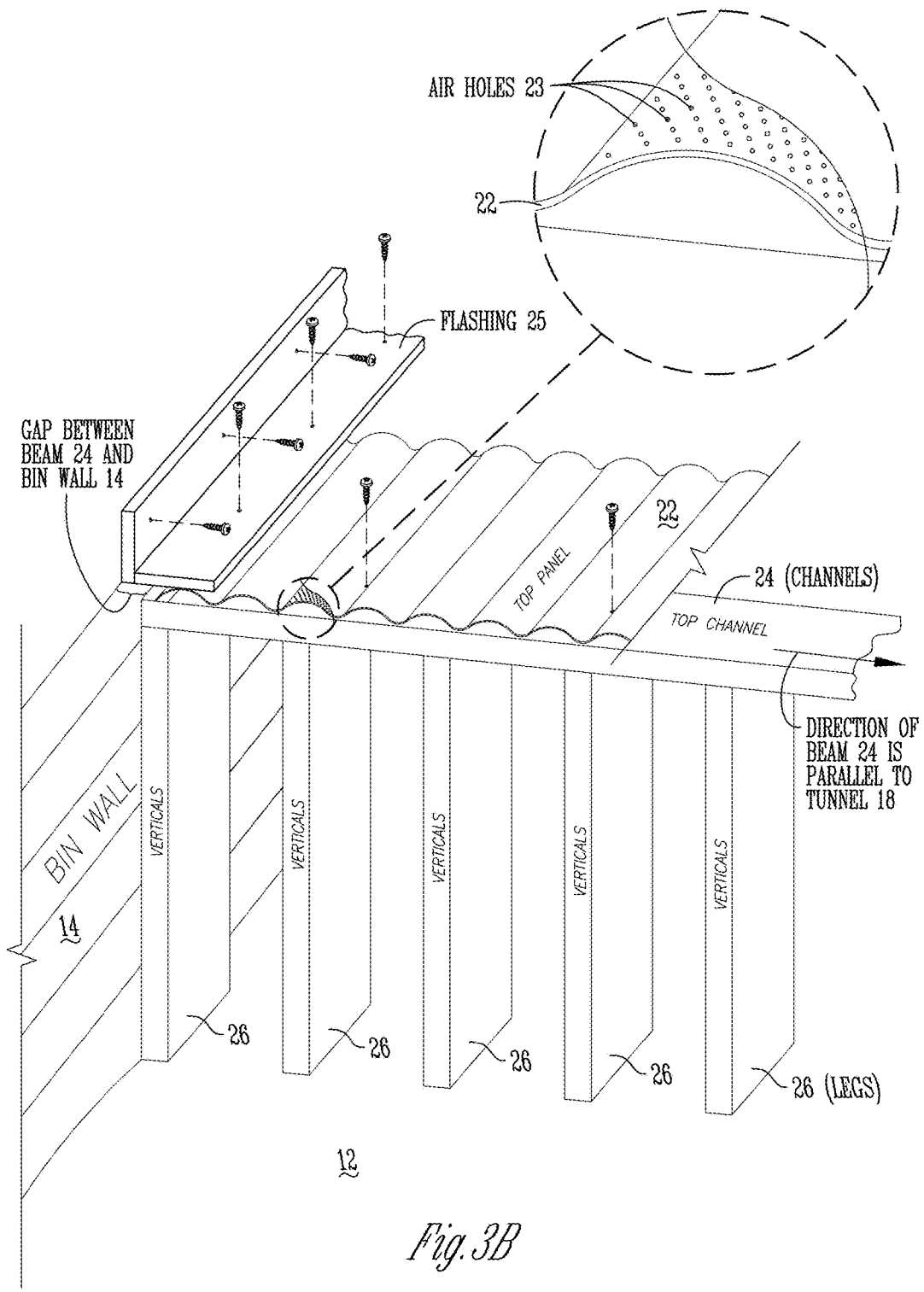
FIG. 3B is a still further enlarged view of the corrugated overfloor and its method of attachment to the channels, as well as an enlarged inset further illustrating air holes in the overfloor.
Figure 4B:
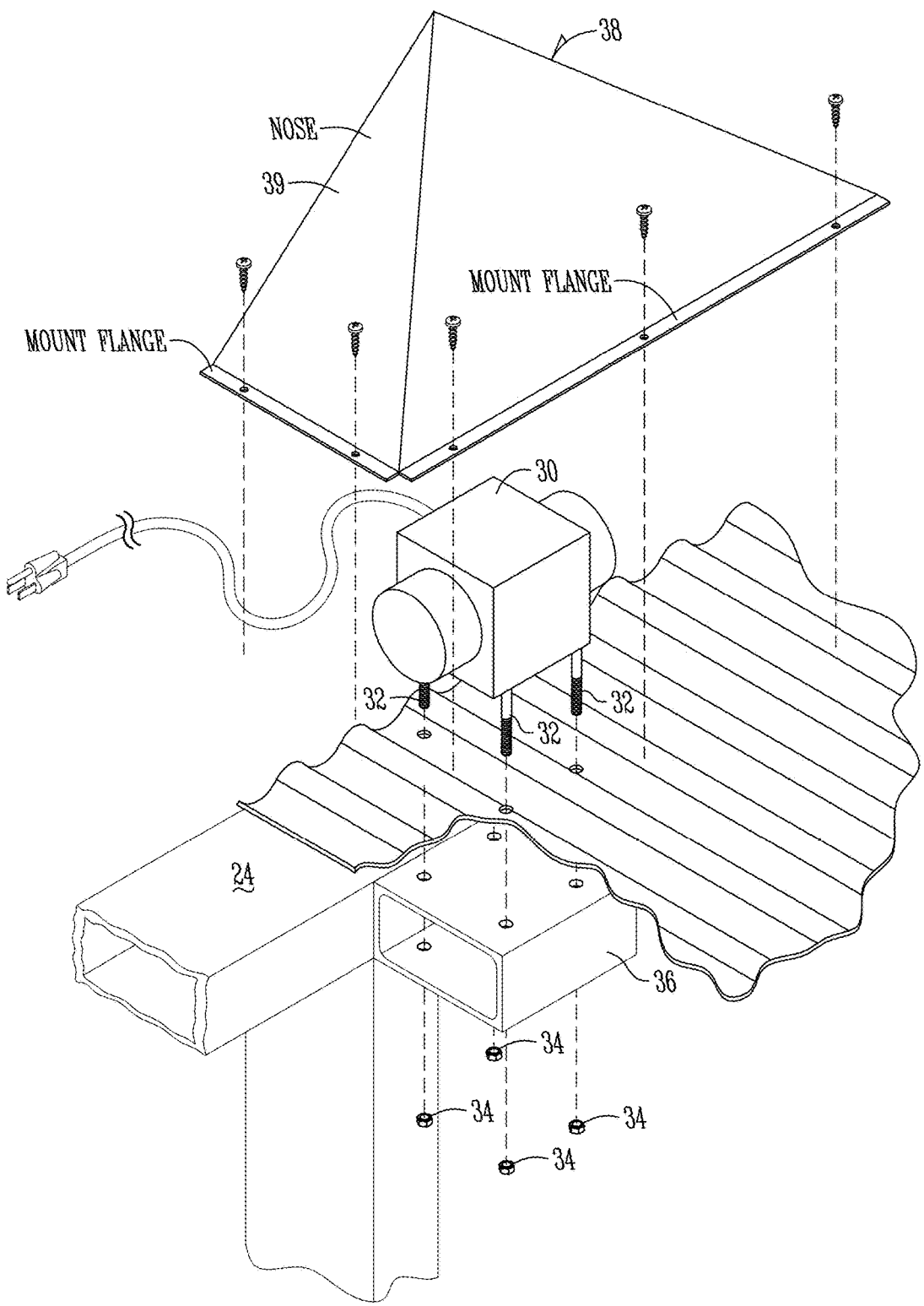
FIG. 4B is a still further enlarged and smaller partial view of vibrator mounting and an optional vibrator cover.

Overflooring corrugated panels 22 cover essentially the entire bin concrete bottom 12 except for the space above tunnel 18 and opening 19, and perhaps some small gap between flooring 22 and the interior bin wall 14 (which can be covered by, for example, flashing or other sheet metal to prevent grain from falling through or lodging there—see, e.g., FIG. 3B).

In the case of FIGS. 1-3 (cylindrical bin), this means the edges of panels 22 at bin sidewall 14 may have to be cut, trimmed, or shaped to follow its curvature. In the case of panels 22 that come in rectangular form, the installer can customize such panels on site. This is similar to a carpet or tile layer that has to conform the carpet or tile to the walls of a room. Alternatively, it is envisioned that a kit of panels 22 could be made at a factory based on pre-knowledge of the bin diameter (and thus its curvature), and those factory-made panels 22 shipped to and installed at the site.

FIG. 3A shows in simplified fashion a portion of a corrugated panel 22. It has what will be called peaks and valleys all running parallel. In this embodiment, all panels would be installed with the peaks and valleys running in the same direction. Also, in this embodiment, the direction of the peaks and valleys would be generally perpendicular of and towards tunnel 18.

In this embodiment, each panel has small air holes or perforations 23 across it. See also FIG. 3B. This allows pressurized air to be injected below overflooring 22 to aerate grain in bin 10. It will be appreciated that there may be some applications that do not require air holes and non-perforated corrugated panels can be used.

One example of corrugated panels 22 that can be used is corrugated perforated aeration sheet commercially available CHIEF AGRI-INDUSTRIAL DIVISION company of Kearney, Nebr. USA under product number 974-5430.

Further details about panels 22 are:
  Manufactured with 3/32 inch diameter hole perforations 32 formed across sheet 22 on one quarter inch centers with a 60° staggered pattern (See FIG. 3A).
  Peaks of the corrugations are nominal 0.666 inch centers.
  Corrugations depths are nominal ½ inch.
  Manufactured in rectilinear panels, 14 gauge steel.
  When installed, overlap edges of adjacent panels approximately 2 inches.

2. Framing: Horizontal Channels or Beams 24 and Vertical Legs 26

As indicated in the drawings, in this embodiment overflooring panels 22 are sloped at a shallow angle from bin side wall 14 to tunnel 18. In FIGS. 1-3 this slight slope is approximately 2 degrees. This helps influence grain to move to tunnel 18.

To do so, corrugated panels 22 are mounted on top of a framing that supports panels 22 above concrete bin floor 12 at that slope. By referring to the Figures, in this embodiment the framing includes generally horizontal beams or channels 24 to which panels 22 are attached and generally vertical legs 26 attached at upper ends to the bottoms of beams 24 and having free distal or bottom ends. The free or bottom ends of legs 26 are configured to sit on concrete bin floor 12. They are not attached to concrete bin floor 12. They hold up beams 24 and flooring panels 22 like table legs hold up a table top, except that legs 26 support the appropriate portions of overflooring 22 at the above-described slope relative to the horizontal.

As can be appreciated, this means that if concrete bin floor 12 is basically flat and horizontal, legs 26 nearest bin wall 14 will be longest and legs nearest tunnel 18 will be shortest. Legs 26 in-between will decrease in length from outer to inner in a basically linear fashion to produce the desired slope. The different leg lengths can be mathematically determined based on prior knowledge of bin diameter and leg spacing along beams 24. Alternatively, leg length can be customized on site by cutting them to length and testing with an angular level or laser level that can indicate a 2 degrees slope. Thus, like overflooring panels 22, legs can be produced at a factory and shipped in a kit for onsite installation. Or, with a standard length set of legs (or perhaps a few standard different lengths like long, medium, and short), the installation can fabricate the needed leg lengths on site with appropriate equipment.

Note that in this embodiment, the edge of corrugated panels 22 at tunnel 18 would abut the top of tunnel 18 (or stated otherwise, abut the top of concrete bin floor 12 at tunnel 18). Therefore, there may be no legs 26 under the beam 24 that runs parallel and is closest to that edge. For a 105 foot diameter cylindrical bin, leg length might range from zero at the tunnel edge of overflooring 22 to twenty-seven inches on the beam 24 farthest from the tunnel. For a 60 foot diameter cylindrical bin, like that shown in FIGS.

1-3, leg length might range from zero inches at tunnel to eighteen inches farthest away. These types of relationships allow the slight slope and provide volume of space for air to come in under the overflooring and aerate the bin through the perforations in the overflooring. As will be appreciated by those skilled in the art, these are non-limiting examples of the range of leg heights per installation.

The same is true regarding beams 24. They can be factory made to needed lengths or customize cut to length at the site.

In one configuration, beams 24 all extend either perpendicular or parallel to tunnel 18 (i.e. all beams are parallel to one another). As indicated in dashed lines in FIGS. 6A-D, and as indicated in FIGS. 7A and B, one way is to have beams 24 be generally parallel with the tunnel 18. In round bins or enclosures, the length of beam 24 closest to tunnel 18 would be longer than the beam farthest from tunnel 18, and beams 24 in-between would get increasing shorter from near tunnel to farthest from tunnel to accommodate the semi-circular shape of the bin sidewall. Again, beams 24 can be fabricated on-site or pre-fabricated knowing bin diameter. But other beam configurations and orientations are possible.

As indicated at FIG. 3A, panels 22 would have peaks/valleys extending perpendicular to the beams (across the beams). FIG. 3B indicates one way to attach panels 22 to beams 24 is by TEKS® 312 self-drilling screws, such as are known and commonly used to attach corrugated sheet metal to steel supports. These screws would be positioned through the valleys of the corrugations at the intersection of the panels 22 with the beams 24. The number of screws per length of beam will depend on how many the designer believes are needed to prevent lateral movement or separation of corrugated panels 22 from beams 24 over all foreseeable circumstances of use of bin 10. Factors would include, but not necessarily be limited by, amount of load estimated on overflooring panels when bin 10 is fully filled, temperature extremes, and gauge of panels 22.

In the example of FIGS. 1-3, such screws are placed every approximately one foot or so along beams 24, which generally corresponds with valleys.

As will be further appreciated, some bin floors 12 will not be absolutely flat or horizontal. In such cases, legs will have to be fabricated to perform load-bearing across overflooring 22 while maintaining as consistent flooring slope as possible. Again, prior knowledge of the flooring slope plus the topography of the bin floor 12 will allow appropriate leg length for each leg to meet those primary functions. This may require fabrication or customization on site. One example is welding metal shims to the leg bottoms.

Thus, as illustrated in the Figures, the framing allows production of an overflooring above most of the bin floor 12 that is robust and stiff enough to support the maximum capacity of grain possible in the bin, yet have the slight slope, and present enough space between overflooring 22 and bin floor 12 to set the needed or desired static air pressures for aeration of grain in the bin.

Towards that end, in the embodiment of FIGS. 1-3 (e.g. approx. 60 foot diameter round bin), leg length ranges from approximately 18 inches at the longest or peripheral legs to approximately zero inches at the beam 24 nearest the tunnel. These lengths are minimized to balance the aeration needs versus the reduction in potential interior storage space sacrificed by adding the overflooring assembly 20. As is noted elsewhere, however, overflooring assembly 20 can eliminate the need for other residual grain unloading equipment (e.g. sweep augers) in the bin, which by themselves sacrifices some potential bin storage space. Additionally, vibrating floors that require sloped concrete bin floors 12 (such as shown in U.S. Pat. No. 4,907,721) can sacrifice more potential storage space, but are hard to pour.

The free or bottom ends of legs 26 are distributed across the area of overflooring 22 to distribute the load from beams 24 across concrete bin floor 12. And those ends of legs do not have to be attached to concrete bin floor 12, which saves labor and other resources.

As will be further discussed later, it has been found that having overflooring 22 supported on free bottom ends of legs 26 may well improve on the dynamics of operation of the system and thus improve or benefit unloading of the residue grain though vibration of overflooring 22. The top ends of legs 26 can be welded to beams 24 for good structural properties.

Additional details regarding beams 24:
 a. Installed to length from 3.5"×1.5" black A-36 steel.
 b. Manufactured from 14 gauge, although 12 gauge, and perhaps others, would work.
 c. Spacing of beams generally uniform across and parallel to one another.
 d. Spacing depends on load it is designed to carry. For example spacing could be 9 inches, 12 inches, 24 inches or otherwise depending on how much load is contemplated.

Further details of vertical legs 26:
 a. Installed to length of 3.25"×1.5" steel.
 b. Height varies depending on distance away from unloading opening. However, typically includes sufficient space for satisfactory aeration without sacrificing a lot of potential interior storage space.
 c. At least one degree slope, but preferably 2° slope from proximal (nearest unloading opening) to distal edge (nearest bin wall). Although could be closer to and even 0 degrees or over 2 degrees.
 d. Approximately 6 inches center-to-center and substantially parallel to one another, and depending from bottom of beams 24.
 e. If enclosure bottom or floor is uneven, may have to vary length of legs to maintain the predetermined slope. For example, if enclosure floor is concrete with a depression, at least one of the legs at the depression might have to be lengthened or made longer than if floor is perfectly flat. The opposite is true if there is raised portion of floor.
 f. Attached to channel beams 24 by welding at least at two places. In one example it is at the opposite sides of each leg 26 at opposite sides. Note that channel beam 24 is slightly wider than the width of the legs 24 (3½ inches versus 3¼ inches). This provides surface area for the welds. See FIGS. 1 and 3A.

3. Flashing

FIG. 3B diagrammatically illustrates one form of flashing 23 that can be used to fill any gaps between the peripheral edge of overflooring 22 and bin wall 24. One example is L-shaped sheet metal (6 inch vertical wall attached by fasteners to the bin wall 14; 9 inch horizontal wall attached by fasteners to the top of over flooring panels 22). Other gap fillers are possible. This allows some tolerance in the precision of shaping or cutting flooring panels 22 and beams 24. Generally such gaps would be no more than an inch or two at most.

Further details about flashing 25:
 a. L-shaped metal flashing 6 inches tall by approximately 8 or 9 inches horizontal.
 b. Attached by screws or bolts through the bin wall 14 to cover any gap between distal edge of overflooring 30 and bin wall 14 around the enclosure.

c. Would deter grain from falling between a flooring and bin wall.

d. Also is designed to provide tolerance when the distal edge of the flooring is shaped or cut to follow the interior bin wall.

Another form of flashing 25 is diagrammatically illustrated in FIG. 1. Sheet metal elongated pieces (in V-shape) can be mounted along the edges of overflooring 22 along tunnel 18 to help guide grain into tunnel 18 and avoid grain getting under overflooring 22.

4. Vibration Actuators

Similar to the vibrational floor of U.S. Pat. No. 4,907,721, the embodiment of FIGS. 1-3 mounts rotary vibrators at spaced apart positions of overflooring 22. See FIG. 2 for one layout, namely twelve vibrator assemblies 28. However, the configuration of the present embodiment has differences from U.S. Pat. No. 4,907,721.

FIGS. 4A and B illustrate one way to mount each electrically motorized vibrator 30 is by welding a short beam section 36 along the main beams 24 at each location a vibrator will be mounted. Four threaded mounting lugs 32 extend from the bottom of vibrator 28 through openings drilled in overfloor panel 22 and short beam 36 and a robust mount for each vibrator is created. Nuts 34 would tighten everything together. In this manner, operation of vibrator 30 (here using eccentric weights rotating along a rotational axis above and parallel to overflooring 22), would set up periodic vibration through lugs 32 to short mounting beam 36. Vibrations would be translated/transferred to main mounting beam 24, and then to overflooring panels 22. The support of beams 24, vibrators 30, and overflooring panels 22 by legs 26 on concrete bin floor 12 with its great mass, would channel or focus the vibrational forces to the least massive pieces, namely the relatively thin corrugated overfloor panels 22.

Although relatively stiff, particularly because of the corrugations, and thus resistant to deformation, the panels 22 are elastic or flexible enough to vibrate and create forces that can further translate at least some to any grain on overflooring panels 22. Such forces can influence any grain in repose to move in the direction of the slope of overflooring 22 to the tunnel 18 and its unloading openings 19.

Further details about vibrator 30:

a. One example is commercially-available model number M3932 Martin Cougar® B-Series (see Operators Manual M3932 for Martin® Cougar® B Series Hazardous Location Vibrator available on-line at http://martinengineerings3.s3.amazonaws.com/www.martin-eng.co.uk/resources/M3932.pdf (accessed Jun. 1, 2017) and incorporated by reference herein and referenced hereafter as "M3932 Manual").

b. Arranged in spaced apart positions on top of the overflooring 30. See example of FIG. 2. This is a 60 foot diameter cylindrical bin.

c. In another example for 105 foot diameter metal wall grain bin there are 32 vibrators, 16 foot on center, each one covering approximately 256 ft.

d. Each attached by four threaded rods through corrugated overflowing panel with locking nuts on bottom. See FIG. 4.

e. Electrically powered from a normal electrical service. A short section of channel beam 36 is attached along the side of a top channel beam 24 at each mounting location for structural support. See FIG. 4.

f. 1650 RPM produces approximately 1650 vibrations per minute.

g. See "M3932 Manual" and COUGAR® B3x-1000-1A-4 vibrator for operational and installation details, including:
  Four bolt mount
  Bolt size affects torque
  Three phase motor
  Eccentric weights (adjustable weight and fixed weight)
  Duplicated both ends (mirror image)
  Of course, alternatives are possible. This would include different brands, configurations, and performance characteristics.

5. Vibrator Covers

Similar to U.S. Pat. No. 4,907,721, optional covers 38 can be removably mounted over each vibrator 30. One example is formed sheet metal having stiffness to withstand loads of a fully loaded bin 10. As shown in the Figures, cover 38 can have shaped sides, here a nose 39, on the side pointing towards the bin wall 14 (and thus pointed opposite the direction grain will be influenced to move by vibration). This can help direct grain around a vibrator. See FIG. 4B for additional details.

Further details:

a. 12 gauge steel box shape with angled nose. See FIG. 4. See also FIG. 2.

b. Has at least two horizontal flanges allowing it to be screwed or bolted to the corrugated floor panels to cover the vibrators.

c. Size to leave on the order of a couple inches or so between the vibrator and inside of the cover for thermal insulation and disbursement of heat when the motors are operating.

d. Tapered nose is pointed in the direction of the distal edge of the up flooring or in other words away from the unloading opening and towards the enclosure wall to promote grain being and moving around the vibrators.

It has been found, however, that such covers are not necessarily needed. As indicated in FIG. 1, the system could be implemented without such covers in cases where the vibrators, including its exterior, its mount, and its power cord (e.g. wiring protection), are robust enough to take the forces and environment of these types of bins and the product in the bin. This could reduce cost and complexity of the system. The vibrators of the incorporated by reference M3929 Manual meet this for at least many of the bin sizes and particulate matter types relevant here. Therefore, some of the Figures show covers over at least some vibrators to give an indication of how they would be placed and configures. But they are optional and many times will not be used or needed. Flow of particulate matter past exposed vibrators has been found acceptable at least in a number of typical installations.

6. Vibrator Control

A control system for operation of vibrators 30 can take different forms. One example is a simple manual switch panel (FIG. 5A) which allows an operator to turn any vibrator 30 on or off at any time. Another is an automatic or semi-automatic control circuit, which could include a programmable microprocessor or digital controller (see FIG. 5B). Such a controller could allow a touch panel control of individual vibrators or have some other human-machine-interface for the same. Or it could automatically instruct vibrator operation according to a program. Other control configurations are, of course, possible.

7. Aeration

See U.S. Pat. No. 7,556,465 for general illustration of blower fan for aeration. One benefit of the embodiment of FIGS. 1-3 is the ability of the corrugated panels 22 to be (a)

a support for the load of a filled bin without failure, (b) a vibrational surface to impart vibrational forces, and (c) be air permeable by perforations. This subtle but important interplay of functions is beneficial.

Further details are:
a. Aeration is shown in FIG. 1 (see also FIG. 3B).
b. The vertical legs suspend the overfloor 30 above the bottom of the enclosure at the 2° slope and present in air space above bin floor 12.
c. Air from a squirrel cage fan or blower mounted outside the bin 10 directed through sidewall 14, into the airspace and then through the perforations in the flooring 30 panels for aeration of the contents of the grain bin.
d. Such fans and inlet transition are well known in the art.
e. The owner or operator of the bin can adjust the static pressure in the bin by adjustment of the fan according to need or desire.

C. Operation

As will be appreciated, the operation of the overfloor assembly 20 according to the first exemplary embodiment, can take different forms. As indicated above, an operator (by skill or experience) could turn one or more vibrators on at various times or stages of system operation to influence movement of residual grain in bin 10 to tunnel 18.

Alternatively, all vibrators 30 could be concurrently turned on each time. However, as will be appreciated, this may not be the best technique in terms of power usage or unloading efficiency and effectiveness. Trial and error may inform the better techniques.

One method (see also FIG. 12) found to be effective for at least some unloading is as follows relative to the circular corrugated steel wall built the way of FIG. 2:

Step 1: Unload as much grain as possible by opening all of the plurality of traps or openings 19 across the central diameter of the bin 10. See FIG. 2. Allow as much unloading by gravity feed through those openings as possible.

Step 2: Close all openings 19 except one center opening.

Step 3: Turn on four vibrators 30 surrounding closest to center opening and observe grain traveling to center opening.

Step 4: When noticeable slowdown in grain entering center opening, turn on four additional vibrators, preferably at spaced apart locations around center opening. By "noticeable slow down" it is meant some observable direct or indirect indication of substantial slowing of grain flow. One direct way is by visual observation of the operator. An indirect way is calibration of auger or other motor which is removing grain from the tunnel. For example, some such motors have ammeters or other sensors that indicate load on a motor. This can be calibrated or estimated to correlate with a "noticeable slowdown" in amount of grain. In one example, the four additional vibrators turned on are lateral from the center tunnel 18. Other patterns of additional motors switched on are possible.

Step 5: Again when noticeable slowdown is observed or sensed, open one or more other gates for other unloading openings 19. In this example, a worker can walk into tunnel 18 and manually turn a valve or crank to open each selected gate.

Step 6: Turn on additional, perhaps two more, vibrators.

Step 7: Again upon noticeable slow down turn on more vibrators, for example two, and open more gates.

Step 8: The operator can decide on how many more motors, which motors, and how many more gates at each phase of this unloading process.

FIG. 5A shows an electrical schematic where an operator would throw manual switches to turn on any vibrator motor the operator sees fit. FIG. 5B shows an alternative. A microprocessor or programmable digital controller or the like could be programmed to go through the steps automatically based on a pre-designated timing sequence or some other factors. For example, it might monitor an unloading auger motor to determine when sufficient slowdown of unloading has occurred to turn on more vibrators and/or open more gates. Other sensors or monitoring metrics might be utilized. Still further, the processor might simply take instructions from an operator via a human-machine interface, for example a keyboard and mouse, touchscreen, or the like. Still further, an application might be written for a smart phone or other portable digital device so that an operator could easier control the sequencing of events.

As will be appreciated, the method can change according to desire or need.

D. Theory of Operation

The combination shown in the Figures therefore essentially covers the cross-section of whatever enclosure it is installed into except for unloading openings in or at the structure's bottom. As can be appreciated in FIG. 2, this would require cutting or forming the distal edges of the corrugated over flooring panels to at least roughly follow the interior curvature or other form factor of that circular enclosure. If other than circular, the panels would be similarly configured to reach the edges and follow those interior walls. As mentioned, the panels would originally typically come in rectangular or square sizes. They could be overlapped at adjacent edges and the designer would plan how to lay out those panels based on their original size and also how to cut or shape of the distal edges of overfloor as discussed.

In this example, the horizontal top channel beams 24 are generally spaced apart parallel to one another consistently across the bin.

In this example, the corrugations are at a right angle to the direction of the top channels 24. It has been found that this imparts vibration along the longitudinal axis of each top channel 24 transversely along the direction of corrugations of the panels 22 to promote moving any particulate material on top of the corrugated overflooring along the slope towards the unloading opening or openings 19.

As indicated in FIG. 1, this basically utilizes two main sections of overflooring; one on each opposite side of the center unloading tunnel 18. They are basically semicircular and have a consistent slope towards that center loading tunnel. Because of the very slight degree slope angle, this does not waste a lot of storage space inside the bin, even though the overflooring is elevated. But it allows easier construction into basically semicircular flat, corrugated, sloped surfaces towards that middle unloading tunnel.

However, in some enclosures with perhaps just one central unloading opening, the overflooring might be one continuous piece around that single opening. Or it might be made to simulate or approximate an inverted truncated cone with pie shaped flat pieces side-by-side each slope to 2° towards that single center opening.

Alternative configurations are possible.

The just above-described example of operation would try to start vibrations nearest a central unloading opening to clear residual grain nearest the central opening. Thereafter additional vibration actuators would be turned on in sequence to move outward until all or substantially all grain has been vibrated along the overflooring to at least one unloading outlet 19.

It may be possible to flex the corrugated overflooring panels and create some curvature in some circumstances. However, in the larger diameter enclosures, with plural openings along the center diameter, opposite overflooring sections with flat surfaces towards the tunnel may be preferred for ease of construction.

As can be appreciated, bins of the sizes discussed can hold thousands of bushels of grain. Gravity feed would many times allow unloading of perhaps at least 90%. However, the 21° angle of repose of corn, for example, might leave on the order of 8 to 10 percent unloaded. The present invention addresses that issue.

Further benefits of the invention can include:

a. Use of corrugated overflooring allows a higher gauge metal which is lighter and less expensive.
b. Testing indicates that unloading of residual grain is so complete that other unloading components can be eliminated. For example it can allow getting rid of a sweep auger. This can further reduce cost of the overall bin.
c. In this embodiment, a 2° slope is utilized and has been found effective in testing. However, it may be possible to have a smaller slope. A 1° slope may be possible for reasonable operation although it might take longer. Also, it is not necessarily required that there be any slope. A horizontal surface may work to at least some extent.

The specific gauge and details of the structural members can vary according to need or desire at least over some range. The invention again tries to utilize the most cost-effective materials for a given application in light of the forces they will experience. For example, the number and spacing of the horizontal top channels and vertical legs can vary according to need or desire. And it has been found that allowing the lower ends of the vertical legs to be unbound and simply abut the bottom floor of the bin is effective at supporting the overflooring and allowing the vibration to operate effectively. In fact, the inventor found that connecting the bottoms of the legs would tend to dampen the vibrational forces.

The specific overflooring described above with corrugations has been found to be effective for supporting the types of loads that most grain storage facilities, even the larger concrete silos or large buildings, would impose.

Another benefit of this embodiment is repair and maintenance. For example, the vibrators are directly accessible when the grain is unloaded as they are mounted on top of flooring panels and there is space underneath the flooring. To remove a vibrator, a worker simply has to remove a few overflooring screws, lift a panel 22 or two, and remove nuts 34 holding vibrator 30 to a mount 36. If optional covers 38 are used over the vibrators, it can be quickly removed from relevant vibrators.

As will be appreciated, if the diameter or surface area of the over floor is less than that shown in FIG. 2, less vibrators may be needed. It currently has been found that one vibrator per 256 ft² for the corrugated overflooring seems to work effectively. Thus, a bin half the diameter of FIG. 2 might work with just four vibrators. The designer can adjust this.

Another key benefit of the invention is safety. Effective operation avoids a person having to go inside the bin or enclosure and manually sweep. It also can avoid having two people conduct bin unloading. Current government regulations for at least commercial facilities requires at least two people to be involved with each unloading. Because unloading can take hours, the elimination of labor costs for one person can be substantial.

Again, with 2° slope as an example, it does not occupy an exceedingly large amount of interior storage space. It holds more bushels than vibratory floors that need a cone shaped floor of poured concrete.

E. Options and Alternatives

Certain options and alternatives have been discussed above. Again, variations obvious to those skilled in the art could be included within the invention and the invention is not limited to the specific embodiments discussed above.

The example of vibratory actuator Martin Cougar B series model M3932 is described in detail at M3932 Manual. Variations are possible as might be different types of vibratory actuators. This one has been found to be effective. A technical description is B3X-1000-1A-4 230-460V, 60 Hz, three phase, FRIA, electric vibrator in NEMA 9. See M3932 Manual. It has been found to date that electric-powered eccentric rotating weights are effective.

This invention is an apparatus that unloads and cleans the bottom of a grain bin or silo after the grain stops running out. It combines vibrators with a special air floor, but vibrations change the angle of repose of the grain from 21° to zero so that it will run out the floor opening. The air floor and the floor supports are much heavier than a standard air floor and floor supports. They are designed to carry the vibrations from the vibrator out to a large area. This invention will unload the leftover grain from a bin or silo so that no manual labor is required. Therefore, no person has to go in the confined space with hazardous equipment (sweep auger) running or with piles of grains which can avalanche and suffocate the person. This invention replaces the sweep auger. Every year people die in grain bins and silos. This invention will save lives. This invention also complies with OSHA.

It has been found, at least in the illustrated examples, that a corrugated overfloor carries vibrations out a substantial distance (e.g. to 30 feet from each vibrator). The floor support tops 24 are a formed channel that carries the vibrations 90° to the floor. The vibrations have been found to be carried in all directions e.g. to or even to more than 30 feet. The vibrator vibrations change the angle of repose of the grain from 21° to zero so that it will run out the floor opening. Corrugations allow a smaller gauge metal panel, and thus usually cheaper and lighter sheet metal.

Corrugated sheet metal is stiffer than a flat sheet using the same amount of material, at least in the direction of the corrugations. They work by increasing the "second moment of area" of the structure. The same principle applies to, e.g., I-beams. For a rigorous mathematical explanation, see the Euler-Bernoulli beam equation. However, non-corrugated overflooring might be used and still utilize the benefits of the combination of the overflooring and framing, as described.

In the past, sweep augurs were used and then someone still needed to go in and use a broom. The disadvantage to that is a man is in the bin. The invention cleans so that no one has to go in it.

Other ways use air to move the grain but they are expensive and do not do a complete job. There are other vibrating floors but they use heavy metal and are very expensive. They do not aerate the grain so that a separate air system is needed.

This invention is cost competitive with an air floor and a sweep auger so that safety will not have to cost more.

The first embodiment of FIGS. 1-3 is two semi-circular overflooring sections 22L and 22R on either side of tunnel

18 (see also FIGS. 6A and B). The slight slope and overflooring panels can be easier to install as substantially flat flooring sections than some type of surface of revolution.

FIGS. 7A and B show how such an arrangement would look for a rectangular grain storage enclosure. Again, two flat or planar overflooring sections 22L and 22R on opposite sides of tunnel 18 would influence residual grain to tunnel 18.

FIGS. 8A and B show an alternative. Instead of two planar opposite sections, pie-shaped sections 22A-22n could each have the general slight slope but simulate better a two opposite semi-circular overfloor sections to a center tunnel for a cylindrical bin. Each pie-shape overfloor section would still be substantially planar or flat, and again, this tries to simulate the two sections 22L and 22R of FIGS. 6A and B, but here made of several pieces. Note that top channel beams could be dedicated to and built under each pie-shaped section 22 as shown at reference numbers 24 in FIG. 8A or B. Alternatively, they could be more like the channels 24 in FIGS. 6 and B (several pie-shapes would mount over long beams 14 across the bin) and the pie shapes laid over and secured to them.

FIGS. 9A and B in simplified form illustrates that it is possible to build an embodiment with a conical section overflooring 22. Because of the slight slope needed (e.g. 1, 2, or just a hand-full of degrees) and because there is some flexure capability in most sheet metal, including corrugated, such a non-planar shape is envisioned to be possible. Others, (e.g. oboloid, parabolic, hyperbolic rotated surfaces or even combinations) might be possible for such slight slopes. Note that the channel beams 24 could be distributed under each pie shape concave section as indicated by dashed lines in FIG. 9A. Variations are possible to mount the non-planar sections 22 to top channel beams. Note also that this embodiment shows a single centrally-located unloading opening. The invention can be applied to bins or enclosures with single openings or multiple openings.

FIGS. 10A and B show diagrammatically another possible embodiment. An overfloor 22 made of panels with corrugations in the direction of slope from one side of the bin to an unloading opening 19 in the lower sidewall of the bin could accommodate that type of unloading arrangement.

FIGS. 11A and B illustrate in simplified form the type of overflooring of FIGS. 7A and B, but also diagrammatically (in greatly exaggerated fashion) illustrates not only the slope of (e.g. 1 to 5 degrees) of each overfloor section 22L and 22R relative to true horizontal, but also the approximately 20-30 degree angle of repose of grain $a_g$ such as corn. This is the type of residual grain that is left after gravity unloading ceases to be effective, and is what vibrating overflooring 22L and 22 R influences towards tunnel 18 to unload residual grain.

As will be appreciated, all of these variations in FIGS. 6A-B to 11A-B utilize the similar combination of features as in FIGS. 1-4. A network of generally horizontal (except for the slight slope to a bin unloading outlet or outlets) beams or channels (e.g. top channels 24) are supported on a plurality of generally vertical legs (e.g. legs 26) that have free distal ends that abut the bottom of the bin or enclosure (e.g. the original bin concrete or other floor). An overfloor is mounted on top of the network of top channels (e.g. corrugated, flat, or other). A set of vibrators is distributed across the overflooring and tied into the network of overflooring and top channels. This combination takes advantage of the free bottom ends of the legs (distal from the overflooring and resting on the bin original floor) to generate forces effective to (a) disrupt any angle-of-repose-inhibited particulate matter left in the bin after normal unloading, and (b) otherwise promote movement of particulate matter down the slope of the overflooring to one or more unloading outlets or locations. The configuration further allows the ability, if desired, to promote effective air flow into the bin and particulate matter even when the bin is full (or any stage inbetween full and empty) by having perforations, apertures, holes, or slots (or other air permeable features) in the overflooring.

It is to be further understood that the designer could choose the number, spacing, and placement of vibrators according to need or desire. The examples above illustrate a few possible configurations. There may be times where additional vibrators are added. For example, in one application in an approximately 60 foot diameter round bin like FIGS. 1 and 2 (e.g. a 63 foot diameter), five additional vibrators were added down the center diameter (across the center of the bin tunnel) to encourage effective operation. Of course, the designer can make such choices based on need or desire.

As mentioned, the layout of network of top channels and legs can vary according to need or desire. The designer can select the size, materials, spacing, and number of these components for each application. But, once a configuration is proven effective, kits or preassembled components for similar applications can be manufactured and be available for efficient and economical transport and assembly at an installation.

It is further to be understood that the exemplary method of FIG. 12 could also vary according to need or desire.

What is claimed is:

1. A vibratory overflooring assembly to influence residual particulate material to at least one unloading opening comprising:
   a. an overflooring section;
   b. a framework under the overflooring section;
   c. one or more vibrational force generators operably coupled to the overflooring section;
   d. the framework comprising:
      i. main underbeams having a direction and to which the overflooring section is mounted;
      ii. downward depending legs having upper ends attached to the underbeams and lower ends free and unattached;
      iii. wherein the legs are configured to support the overflooring section at a slight slope toward the at least one unloading opening of at or between 1 and 5 degrees in a direction relative to horizontal;
   e. wherein the overflooring section comprises corrugated sheet metal having corrugations with a direction and the direction of corrugations are at least generally in the direction of the slope;
   f. wherein the direction of the main underbeams is transverse to the direction of the slope and the direction of the corrugations.

2. The overflooring assembly of claim 1 wherein:
   a. the lower ends of the legs are adapted to abut a floor of a bin, enclosure, or building.

3. The overflooring assembly of claim 2 wherein the corrugated sheet metal comprises, with or without aeration perforations a 14 gauge steel sheet with peaks of corrugations at nominal 0.666 inch centers and corrugation depths a nominal ½ inch.

4. The overflooring assembly of claim 1 in combination with a particulate matter storage enclosure having a sidewall, wherein the overflooring comprises a perimeter edge which is shaped to follow a portion of the sidewall of the particulate matter storage enclosure.

5. The overflooring assembly of claim 4 wherein the sidewall of the particulate matter storage enclosure comprises one of:
   a. a cylindrical shape;
   b. a rectangular or square shape;
   c. an asymmetrical shape.

6. The overflooring assembly of claim 1 wherein the particulate matter comprises grain.

7. The overflooring assembly of claim 6 wherein the grain comprises corn.

8. The overflooring assembly of claim 1 wherein the underbeams comprise metal tubes and the legs comprise metal tubes.

9. The overflooring assembly of claim 1 wherein the vibratory generator comprises an electric motor rotated eccentric weight or weights.

10. The overflooring assembly of claim 1 in combination with a particulate matter storage enclosure and at least one of:
    a. a concrete floor to support the overflooring and the framework for the overflooring;
    b. at least one unloading opening in the floor;
    c. an aeration system;
    d. a grain unloading subsystem under the floor.

11. A method of unloading residual particulate matter from a particulate matter storage enclosure having a floor and a sidewall extending upwardly from the floor, and at least one unloading opening in the floor or the sidewall near the floor comprising:
    a. adding an overflooring spaced from and over the floor having a slight slope in a direction toward the at least one unloading opening wherein the overflooring comprises corrugated sheet metal having corrugations with a direction and the direction of the corregations are at least generally in the direction of the slope; the overflooring supported by a framework comprising:
       i. main underbeams having a direction and to which the overflooring section is mounted;
       ii. downward depending legs having upper ends attached to the underbeams and lower ends free and unattached;
       iii. wherein the legs are configured to support the overflooring section at a slight slope of at or between 1 and 5 degrees relative to horizontal; and the direction of the main underbeams is transverse to the direction of the slope and the direction of the corrugations;
    b. vibrating the overflooring at a frequency and force to influence residual grain along the slope toward the at least one unloading opening.

12. The method of claim 11.

13. The method of claim 11 wherein the spacing is by a framing comprising:
    a. parallel, spaced-apart underbeams under the overflooring;
    b. perpendicular, downward-depending legs from the underbeams.

14. The method of claim 13 wherein the legs have distal free ends that sit on but are not attached to the floor.

15. The method of claim 11 wherein the slope is in the range of 1 to 5 degrees.

16. The method of claim 11 wherein the slope is in the range of 1 to 2 degrees.

17. The method of claim 11 wherein the vibrating comprises electrically-powered rotary vibrating generation.

18. The method of claim 17 wherein the vibrating comprises approximately several thousand rpm.

19. The method of claim 11 wherein:
    a. the enclosure comprises a bin, silo, or building; and
    b. the particulate comprises grain.

20. The method of claim 11 wherein the overflooring is one of:
    a. a single section;
    b. two opposing planar sections;
    c. a plurality of sections;
    d. a plurality of pie shaped sections;
    e. a surface of revolution;
    f. one or more panels with perforations.

21. A grain bin comprising:
    a. a concrete bin floor;
    b. a bin sidewall extending up from the bin floor;
    c. the at least one unloading opening in the bin floor;
    d. an overflooring assembly according to claim 1 having the framework supported on the bin floor and the overflooring spaced from the bin floor.

* * * * *